Inventor:
Rudolf Hell,
By. [signature] Atty

Inventor:
Rudolf Hell.
By [signature] Atty.

Jan. 14, 1958 R. HELL 2,819,941

FACSIMILE TELEGRAPH RECEIVER

Filed Feb. 20, 1953 3 Sheets-Sheet 3

Inventor:
Rudolf Hell.
By [signature] Atty.

United States Patent Office 2,819,941 Patented Jan. 14, 1958

2,819,941

FACSIMILE TELEGRAPH RECEIVER

Rudolf Hell, Kiel-Dietrichsdorf, Germany, assignor to Dr.-Ing. Rudolf Hell, Kommanditgesellschaft, Kiel-Dietrichsdorf, Germany, a German company Application February 20, 1953, Serial No. 338,119

Claims priority, application Germany May 2, 1952

22 Claims. (Cl. 346—101)

This invention is concerned with a facsimile telegraph receiver, and the object of the invention is to provide a particularly simple apparatus which is adapted for the direct printing of black-white images upon normal paper by solely mechanical means.

Known apparatus for the direct printing of facsimile transmissions—the term is intended to mean the transmission of black-white images—employ in most cases especially prepared paper, for example, electrochemically moistened paper or paper that has been color-treated by spark discharge. The operation of such apparatus causes great expenses due to the continual use of such special paper.

Another known facsimile system (provided by the applicant) is adapted for the direct printing upon normal paper, but is limited to the printing of symbols in accordance with impulses in a sequence which is determined by the transmitter.

The black-white image, which is to be transmitted in a facsimile system, is photoelectrically scanned in the transmitter, and the resulting image impulses are in usual manner transmitted over transmission lines or by wireless transmission. The image impulses are amplified in the receiver and are conducted to a printer device comprising, for example, a printer spiral and a suitably controlled printer bar. The printer spiral and the printer bar are disposed in the plane of the line to be printed and extended over the entire width of the recording paper. The term "printer line" or, briefly, "line" is used in the following discussion to mean a line that has been scanned once or, rather to say, a printed line that extends over the entire width of the recording paper. The printed symbols or image fractions are then composed of several lines that have been printed one underneath the other. The printer spiral, which is suitably inked, for example, by an ink roller, is formed on a drum in the manner of an edgelike single-turn spiral, the pitch of the spiral corresponding to the length of the line. The edgelike printer spiral has a diameter so that it embraces with the line an angle, for example, of 45°. Facing the printer spiral is the printer bar which is controlled, for example, by an impulse-responsive magnet. The spiral, responsive to rotation, develops or rolls off in a direction coinciding with the edge of the printer bar along the line to be printed. The recording paper is guided between the edge of the printer bar and the inked edge of the printer spiral normally out of touch with the latter. The bar is pressed against the recording paper, pressing the paper against the printer spiral, responsive to a printer impulse transmitted to the printer magnet, and an imprint is thus produced on the recording paper for the duration of such impulse.

The recording paper is continuously advanced while a line is printed thereon, during the rolling off of the printer spiral relative to the printer bar, the speed of the paper advance being such that the printed symbols of one line will be disposed just adjacent the printed symbols of the preceding line.

The symbols or fractions printed in this manner will be of rhomboid shape having borders which are in the direction of the line respectively determined at the start and at the end of the printer impulse by the borders of the edge of the printer spiral and by the borders of the edge of the printer bar. Such symbol elements produce a disturbing and disquieting total impression.

The invention avoids this disadvantage by the provision of a printer spiral having many turns and a pitch which is relatively small as compared with the total spiral length. In order to prevent, incident to the operation of the printer bar for each symbol impulse, the simultaneous printing of several symbol elements upon a line, corresponding to the plurality of spiral turns, the invention provides for coaction with the printer spiral a printing member which is movably guided in the direction of the line. This member always selects only one spiral turn, thereby causing definite printing of one symbol fraction for each corresponding printer impulse. The movable printing member carries an edge which extends in the direction of the line and which is shorter than the pitch of the printer spiral. The movable member is longitudinally moved in the direction of the rolling-off motion of the printer spiral and at the same speed.

The recording paper is advanced between the edge of the movable printing member and the printer spiral. Between the printer spiral and the recording paper may be disposed an inked ribbon, or the printer spiral may be inked by an ink roller disposed in engagement therewith. Upon delivery of a printer impulse to the printer magnet which controls the printer bar (the bar extending over the length of the line), the bar will not, as in previous structures, press directly against the paper but will press against the movable printing member, and the edge of such member will press the paper against that turn of the printer spiral which happens to be positioned opposite the member.

The new structure and cooperation of parts exhibit numerous practical advantages. The edge of the printer spiral, due to the small pitch of its turns, embraces with the plane of the line an angle which is greater than 45°, for example, approximately 90°, and therefore produces nearly square-shaped printed symbol elements or fractions, resulting in a quiet total impression and a true reproduction of the symbol image. If a rectangular shutter is used in the transmitter for the scanning of the symbols, which is narrow perpendicular to the line and wide longitudinal thereof, there will be printed in the transmitter black-white substantially square-shaped images of the original symbol, which lie along a line and fill the entire width thereof. The printed symbols or symbol elements will start correctly, since their lateral line position is solely determined by the edge of the printer spiral and thus solely dependent on the accuracy thereof. The recording paper is carried taut relative to the edge of the movable printing member and, during a printer impulse, is elastically stressed only within the small region of the edge of the short printing member, as compared with stresses placed previously thereon by the long printer bar which covered the entire width of the paper. The paper is for this reason in good, effective engagement with the edge of the short movable printing member. The printer spiral may be disposed in front of the recording paper, resulting in inking and printing operations which are always clearly observable.

The movable printing member, which according to the invention coacts with the printer spiral, is guided by means corresponding to the three spatial directions of motion. The printing member forming an edge in engagement with the recording paper may be secured to and extend from an endless belt which is actuated to move it relative to the paper longitudinally of the line.

Being connected with and extending from the belt, the printing member cannot move in a direction perpendicular to the plane of the line, having play only which depends on the tautness of the belt. The printing member is operatively moved perpendicular to the plane of the paper by the printer bar to produce with its edge an imprint on the paper, and thereafter restores to its normal position. In order to avoid affecting the belt by the actuation of the printing member, the latter may be made in the manner of a leaf spring which is at one end fastened to the belt and forms the printing edge at the other end, such other end also yieldingly absorbing the pressure action of the printer bar. The belt furnishes in this manner only guidance in line direction and in the direction of the advance of the recording paper.

In another embodiment of the invention, the printer member hangs relatively loosely from the belt and is dragged thereby along the plane of the line. This drag member is relatively free to move with respect to the belt in a direction perpendicular to the line plane, and its edge is for this reason guided in a fixed narrow slot which extends over the length of the line. The printing bar again presses the dragging printer member in the direction of the printed spiral perpendicular to the plane of the recording paper. In order to avoid transmission of this printing motion of the member to the belt, the member is disposed, for example, for pivotal displacement with respect thereto. The special guide means provided for this purpose make the printing member independent of inaccuracies in the various drive members, including the belt or the like.

In accordance with another embodiment of the invention, the movably guided printing member is formed so as to provide for a resilient or yieldable intermediate part which absorbs the printing pressure exerted by the printer bar. It must be considered in this connection that the actuating means for the printer bar is for great operating speeds provided with a strong restoring spring. The resilient intermediate part of the printing member equalizes the harsh impact of the printer bar and also equalizes and compensates for irregularities in the belt drive or in the paper advance, and the edge of the printing member will therefore normally always lie gently and resiliently in engagement with the paper without any danger of damaging, for example, tearing or cutting it. The resilient intermediate part of the printing member must, however, be strong enough to transmit to the printing edge thereof the stroke of the printer bar which is, in view of the great operating speeds, quite small, so as to cause the edge to press the recording paper against the printer spiral. The resilient intermediate part is, according to the invention, formed so as to provide a compromise between these two contradictory requirements.

Instead of providing only one printing member on the endless belt or the like, there may be provided several such members which may in suitable known manner be so disposed thereon that each member scans one line and that the next successive member is in start position for the scanning of the next line at the time when the preceding member reaches the end of the line.

A multiple utilization of the apparatus may be obtained by providing in different line levels two or more printing members and corresponding printer bars for cooperation with such members. The transmission of the symbol impulses for the individual lines may take place simultaneously over separate channels or, for example, over a high-frequency channel with different frequency modulation.

A printer spiral having a plurality of turns may be employed. The individual printing members may then be suitably associated with different turns of the spiral and may scan different lines successively or simultaneously. The individual turns of the spiral may be suitably inked with different colors, to obtain color-differentiated printing.

The invention will now be described with reference to the accompanying drawings, in which Fig. 1 shows an embodiment in simplified schematic perspective representation;

Figure 1:
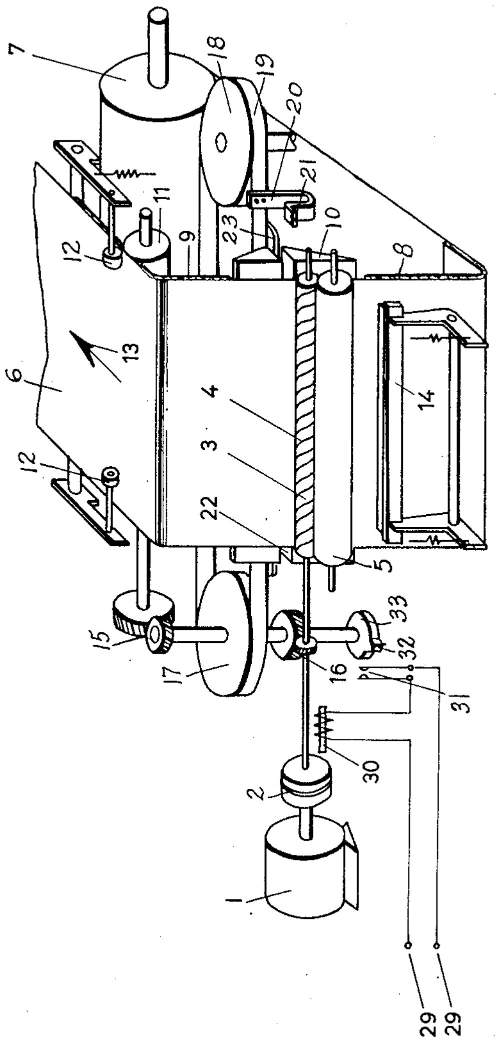

Referring to Fig. 1, numeral 1 indicates a synchronous motor which drives over a clutch 2 the drum 3 carrying a spiral forming a printing edge 4 of many turns. This spiral edge is inked by a roller 5 having a felt covering which is soaked with ink of desired color and is rotated by frictional engagement with the spiral 4. The bearings for the ink roller 5 as well as for the spiral drum 3 and mounting means therefor have been omitted to avoid unnecessarily encumbering the drawing. The same is true so far as bearings or journals and mounting means for other parts are concerned. It is understood of course that suitable known bearings, journals and mounting or supporting means may be provided wherever they are desired or required.

Figure 2:
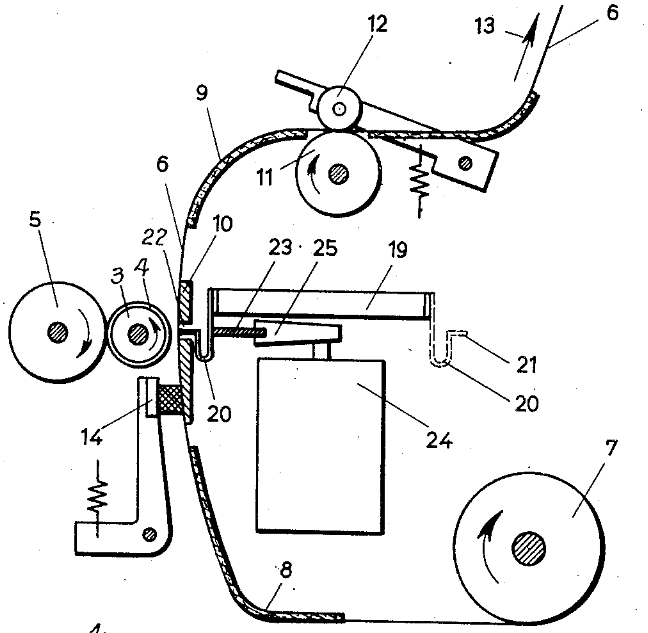
Fig. 2 illustrates the structure of Fig. 1 schematically as seen from one end thereof, some parts being shown on a somewhat enlarged scale and some parts being shown in section.

The recording paper 6, which is drawn from a supply reel 7, extends over angularly shaped guide sheets 8, 9 and a platen or table 10 and is in operation continuously moved in the direction of the arrow 13 (Figs. 1 and 2) by the drive roller 11 which coacts with idler or counter-rollers 12. A brake 14 is provided which presses the paper against the guide sheet 8 as shown in Fig. 1 or against the stationary platen or table 10 as shown in Fig. 2, causing the paper to lie taut against the table 10. The drive roller 11 is rotated from the motor 1 over the gears 15 and 16. The gear 16 also rotates the two wheels 17 and 18 for driving the endless belt 19 to which are secured the printing members 20. These members are moved transverse of the recording paper 6 in the plane of the line to be printed thereon. The gearing 16 is such that the printing edge 21 of a printing member 20 is always positioned opposite a turn of the printer spiral 4.

Each of the printing members 20—21 of Figs. 1 and 2 is made in the form of a generally U-shaped leaf spring. One leg of the spring is secured to the belt 19 and the other leg is bent outwardly to form the printing edge 21 which is guided in the guide slot 22 formed by the table or platen 10, the guide slot extending in parallel with the line to be printed. In back of the straight leg of the printing member and engaging it is disposed the printer bar 23 which also extends in parallel with the line to be printed and over the entire length of the line. The resilient base or intermediate portion of the U-shaped printing member equalizes irregularities in the endless belt and in the paper advance, and causes the edge 21 to lie always softly and resiliently against the paper 6.

Numeral 24 (Fig. 2) indicates suitable electromagnetic means which is controlled by printer or symbol impulses delivered thereto for actuating, in response to each impulse, the linkage 25, to press the printing bar 23 against the printing member. This pressure is exerted on the leg of the printing member, which is secured to the endless belt, about midway of the leg. The endless belt is not affected by this pressure action, due to the resilient action of the base of the printing member. The pressure of the printer bar 23 is transmitted to the printing edge 21 which is thus, for the duration of a printing impulse, pressed against the inked edge of the printer spiral 4, to produce a corresponding imprint on the paper.

Figure 3:
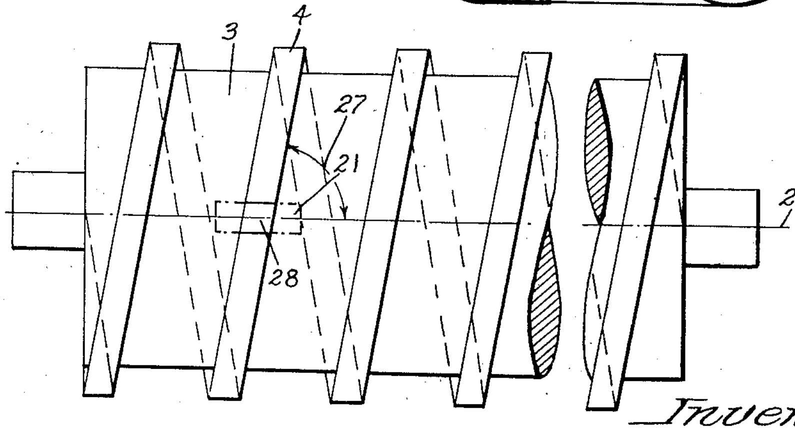
Fig. 3 is a separate, enlarged view of the printer spiral.

The printer spiral has several turns of relatively small pitch and, as shown in Fig. 3, its edge 4 therefore embraces with the plane 26 of the line to be printed an angle 27 of nearly 90°. The symbol or image elements, which are respectively outlined by imprints such as shown in Fig. 3 in solid black at 28, formed by the the edge 21 of the printing member in coaction with the spiral edge 4, thus receive nearly square shape; the imprint 28 being produced responsive to a single printer impulse. The clarity of the printed impressions is due to the cooperation of the spiral 4 with the edge 21 of the printing member.

The printer bar 23 is, upon conclusion of a printer impulse, retracted by the linkage 25. The leg of the U-shaped printing member, which is secured to the belt 19, follows the return-to-normal motion of the printer bar 23. The paper 6 lying taut against the table 10 presses against the printing edge 21 of the printing member, to move it by its resiliency through a corresponding retracting motion, thus severing contact with the inked printer spiral edge 4. The printing edge 21 of the member 20 remains in gentle resilient engagement with the paper.

The start of printing a line by the printing member must coincide with the start of scanning the corresponding line in the transmitter. In order to produce this cophasal operation of the receiver with the transmitter, a phase signal is in known manner transmitted by the latter coincident with each line start. This signal is received over the symbol signal channel. The amplifier output of the receiver, having a terminal tube which is conductive in the absence of symbol impulses, is for phase-calibration connected with the terminals 29 shown in Fig. 1. The space current of the last amplifier stage will then cause the magnet 30 to energize, provided that the contact 31 is closed by the rise 32 on the cam 33. The angular position of the cam 33 is adjusted so that the contact 31 is always closed at the time when one of the printing members 20—21 is in line-start position. The magnet 30 is energized by the space current, as described, and will hold against rotation part of the friction clutch 2 and therewith the drum 3 and the gear 16, while the motor continues to rotate. The printing member 20—21 is thus held standing in line-start position. When a phase signal is now received, the last tube of the amplifier will cease to pass current, and the magnet 30 will deenergize, releasing the clutch 2 and thus permitting the printing member 20—21 to start from its line-start position. The receiver is now in phase with the transmitter. Subsequent phase signals, which are received at each line start, will always block the last amplifier tube, when the printing member 20—21 is in line-start position. The contact 31 will then be closed, but there will be no current flow over the circuit 29, 30, 31, and the operation of the receiver will therefore continue without any interruption.

Signals may in similar manner be utilized for governing the switching on and the switching off of the motor. A suitable and known relay, which is adapted to energize in response to a start impulse, for example, of two seconds' duration, while remaining at rest responsive to printing impulses which are much shorter, may by known circuit means (not shown) be used for controlling the switching on and off of the motor 1. Known circuit means may be provided for transmitting to such relay a corresponding start signal, so as to switch on the motor 1. The transmission and consequent printing of the symbol images can then proceed. The motor may be switched off at the conclusion of the transmission by a suitable and known heat-responsive contact which actuates in a suitable and known circuit to which is transmitted a corresponding stop signal, for example, of ten seconds' duration. The shorter printer impulses and the start impulse do not affect such a contact.

Figure 4:
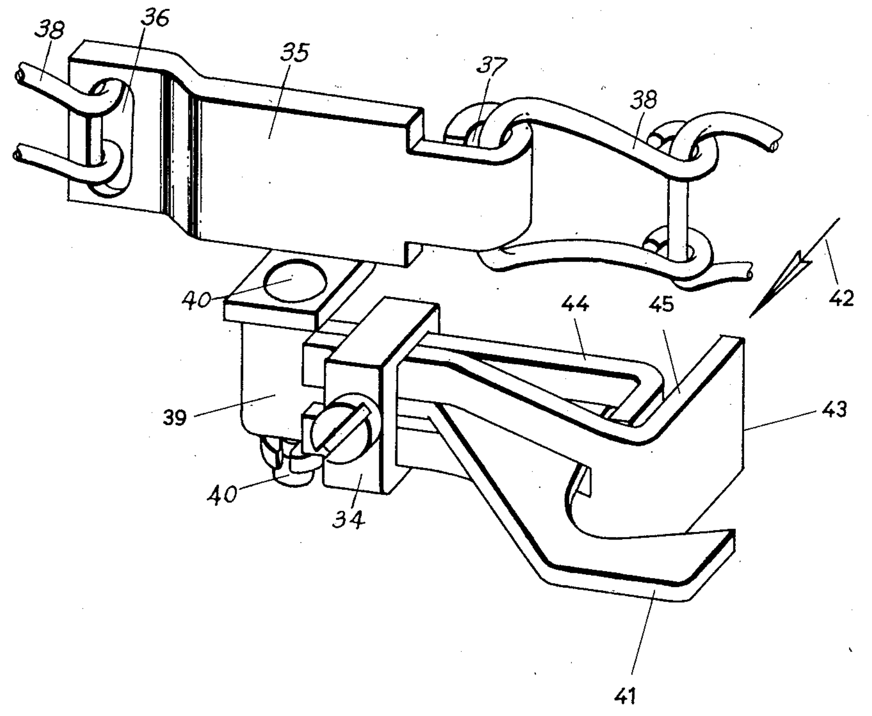
Fig. 4 shows details of a printing member which is dragged along by a drive member, for example, by an endless chain.

Fig. 4 shows an embodiment in which a holder 34 carrying the printing member forming the edge 41 is by a link 35 dragged parallel to the plane of a line to be printed, the link 35 being at 36—37 joined with adjacent chain links 38. The holder 34 is secured to a part 39 mounted on a bolt 40 which is rotatable in a bore formed in an angular extension of the link 35 so as to equalize irregularities in the various parts. The printing member forming the printing edge 41 moves in the slot 22 of the table 10, as described before. The printing motion, which is exerted by a printer bar such as 23 shown in Figs. 1 and 2 (not shown in Fig. 4) in the direction of the arrow 42, is not transmitted to the chain because the printing member with its holder 34 is rotatable relative to the chain link 35. The forward or printing edge 41 of the printing member is always in gentle contact with the recording paper, as in the previously described embodiment. The resilient intermediate part, which transmits the pressure of the printer bar to the printing member, is in the structure, Fig. 4, formed by two leaf springs 44, 45. These leaf springs are at one end held together as shown. The printing member 41 extends from the leaf spring 44. The printer bar exerts pressure on the rearward edge 43 of the leaf spring 45, pressing the printer element 41 forwardly with its printing edge 41 against the recording paper as before, the transmitted pressure being resilient due to the coaction of the two springs 42—45. The printer bar retracts at the conclusion of the printing stroke, and the leaf spring 45 follows the return motion thereof, allowing the printing member with its printing edge 41 to move to normal by the elastic pressure exerted on it by the recording paper.

I claim:

1. Facsimile telegraph receiver for line-by-line printing of symbol elements comprising an elongated rotatable drum carrying a printing spiral having multiple turns coiled about said drum between the opposite ends thereof forming a spirally extending printing edge, the axis of said drum and said printing spiral thereon extending in parallel with the plane of the line to be printed, means for rotating said drum with the multiple-turn printing spiral thereon, a movable printing member for coaction with the printing edge formed by said printing spiral, means for moving said printing member longitudinally of said drum in parallel with and along the plane of the line to be printed so as to select a turn of said multiple-turn spiral for printing coaction with the edge thereof, a printing bar extending in parallel with the plane of a line to be printed for the entire length of said line, and means for impulsewise moving said printing bar to move said printing member impulsewise relative to and for printing coaction with the printing edge of the turn of the printing spiral selected during the motion thereof longitudinally of said drum.

2. A structure as defined in claim 1, wherein said printing member forms an edge for printing coaction with the printing edge of said spiral which extends in parallel with the plane of the line to be printed.

3. A structure as defined in claim 1, wherein said printing member forms a printing edge extending in parallel with the plane of the line to be printed, the length of said printing edge being shorter than the pitch of said printing spiral.

4. A structure as defined in claim 1, wherein an endless movable member constitutes the means for longitudinally moving said printing member, and means for moving said endless member coincident with the rotation of said drum.

5. A structure as defined in claim 1, comprising means for guiding a recording paper inserted therein, a backing member for said paper over which said paper is caused to move in engagement therewith, said paper being normally out of engagement with the edge of said printing spiral but being contacted by the edge of said printing member.

6. A structure as defined in claim 1, comprising means for guiding a recording paper inserted therein, an endless movable member constituting the means for longitudinally moving said printing member, said printing member being resiliently connected with said endless member and extending substantially perpendicularly to the plane of said recording paper.

7. A structure as defined in claim 1, comprising an endless movable member for moving said printing member longitudinally, said printing member being loosely connected with said endless member and being dragged thereby in the plane of the line to be printed.

8. A structure as defined in claim 1, comprising an endless movable member for moving said printing member, said printing member being loosely connected with said endless member and being dragged thereby in the plane of the line to be printed, means forming a slot in which said printing member is guided in its longitudinal motion, the length of said slot corresponding to the length of the line to be printed and its width perpendicular to the line to be printed corresponding to the width of said printing member.

9. A structure as defined in claim 1, comprising an endless movable member for moving said printing member, said printing member being loosely connected with said endless member and being dragged thereby in the plane of the line to be printed, means for guiding a recording paper inserted therein, said printing bar normally engaging said printing member to cause the edge thereof to normally engage said paper when inserted in the guide means therefor.

10. A structure as defined in claim 1, comprising means for guiding a recording paper inserted therein, and operating means for said printing bar responsive to printing impulses delivered thereto for actuating said printing bar to press said printing member against said paper and the latter against said printing spiral.

11. A structure as defined in claim 1, comprising a generally U-shaped leaf spring having one leg which forms said printing member, said printing bar being disposed for exerting pressure on the other leg of said leaf spring.

12. A structure as defined in claim 1, comprising a pair of leaf springs, means for joining said leaf springs at one end thereof, part of one leaf spring projecting through the other leaf spring and forming said printing member, said printing bar exerting pressure on the other leaf spring to actuate said printing member.

13. A structure as defined in claim 1, comprising means forming a relatively stationary support, means for moving a recording paper in relatively taut engagement with said support, means responsive to printing impulses for pressing said printing member with its edge against said paper to press such paper against said printing spiral so as to produce imprints on said paper, said paper by its tautness retracting from said printing spiral and causing retractile motion of said printing member at the conclusion of each printer impulse.

14. A structure as defined in claim 1, comprising an endless movable member carrying a plurality of said printing members for moving said members relative to said multiple-turn printing spiral so as to place one member in line-start position at a time when another member has been moved to the end of the line to be printed.

15. A structure as defined in claim 1, comprising a plurality of groups of movable printing members disposed in several levels, all for coaction with said multiple-turn printing spiral, a printing bar for coaction with each group of printing members, and separate means for actuating said printing bars.

16. A structure as defined in claim 1, comprising a plurality of movable printing members disposed in different levels, a multiple-turn printing spiral on said drum for cooperation with each printing member, and a printing bar for actuating each printing member relative to its associated printing spiral.

17. In a facsimile telegraph receiver for line-by-line printing of symbol elements on a moving recording paper, a printer mechanism comprising parts disposed in front of said paper including rotatable means carrying a spiral having an elevated edge normally out of engagement with said paper, any turn of said spiral having an inclination extending in a plane which forms with the plane of the line to be printed on said paper an angle exceeding 45°, and comprising parts disposed in back of said paper including a member carrying a forwardly projecting edge having a length which is less than the pitch of the turns of said spiral, means for resiliently biasing said member to cause said forwardly projecting edge to rest normally with gentle resilient pressure against said paper, means for longitudinally moving said member so as to maintain the forward edge thereof positioned in back of said paper rearwardly of the spiral and opposite thereto as said spiral unrolls longitudinally responsive to rotation thereof, means forming a longitudinally extending slot for guiding the forward edge of said member during the longitudinal motion thereof, a printer bar disposed in back of said member normally in contact therewith, and impulse-responsive means for pressing said printer bar forwardly to cause said resilient biasing means to transmit such pressure to said member for pressing the edge thereof against said paper and consequently pressing said paper against said spiral to produce an imprint on said paper in accordance with the impulse delivered to said impulse-responsive means.

18. A structure as defined in claim 17, comprising a generally U-shaped leaf spring, one leg of said leaf spring forming said member, the other leg of said leaf spring coacting with said printer bar normally in contact therewith, and the base of said leaf spring forming said resilient biasing means for said member.

19. A structure as defined in claim 17, comprising a pair of leaf springs secured together at one end thereof, one of said leaf springs forming said member, the other leaf spring coacting with said printer bar normally in engagement therewith, and both of said leaf springs coacting to form said resilient biasing means for said member.

20. A structure as defined in claim 17, comprising a platen in back of said recording paper in which is formed said longitudinally extending slot for guiding the forward edge of said member, the forwardly directed surface of said platen forming a backing for said recording paper, means for advancing said paper along said platen past said slot therein, and brake means in front of said paper for exerting pressure thereon to keep it taut.

21. A structure as defined in claim 17, wherein an endless belt constitutes the means for longitudinally moving said member.

22. A structure as defined in claim 17, wherein an endless chain constitutes the means for longitudinally moving said member.

References Cited in the file of this patent

UNITED STATES PATENTS

| | | |
|---|---|---|
| 1,598,739 | Mettler | Sept. 27, 1926 |
| 2,005,108 | Pudelko | June 18, 1935 |
| 2,390,364 | Gibbs et al. | Dec. 4, 1945 |
| 2,492,062 | Potter | Dec. 20, 1949 |
| 2,529,978 | Thompson | Nov. 14, 1950 |